(12) United States Patent
Iwai et al.

(10) Patent No.: US 9,426,553 B2
(45) Date of Patent: Aug. 23, 2016

(54) MICROPHONE ARRAY ARRANGEMENT STRUCTURE IN VEHICLE CABIN

(71) Applicant: Honda Access Corp., Niiza-shi, Saitama (JP)

(72) Inventors: Shiro Iwai, Niiza (JP); Kazuhiro Nakadai, Wako (JP); Hiroshi Tsujino, Wako (JP)

(73) Assignee: HONDA ACCESS CORP., Niiza-Shi (JP)

( * ) Notice: Subject to any disclaimer, the term of this patent is extended or adjusted under 35 U.S.C. 154(b) by 44 days.

(21) Appl. No.: 14/356,274

(22) PCT Filed: Nov. 6, 2012

(86) PCT No.: PCT/JP2012/078685
§ 371 (c)(1),
(2) Date: May 5, 2014

(87) PCT Pub. No.: WO2013/069620
PCT Pub. Date: May 16, 2013

(65) Prior Publication Data
US 2014/0286504 A1 Sep. 25, 2014

(30) Foreign Application Priority Data
Nov. 7, 2011 (JP) .................................. 2011-243535

(51) Int. Cl.
| H04B 1/00 | (2006.01) |
| H04R 1/02 | (2006.01) |
| B60R 1/12 | (2006.01) |
| H04R 1/40 | (2006.01) |
| H04R 1/20 | (2006.01) |
| H04M 1/60 | (2006.01) |
| H04R 1/32 | (2006.01) |
| H04R 1/08 | (2006.01) |
| H04R 3/00 | (2006.01) |

(52) U.S. Cl.
CPC ........... *H04R 1/028* (2013.01); *B60R 1/12* (2013.01); *H04R 1/02* (2013.01); *H04R 1/406* (2013.01); *H04M 1/6091* (2013.01); *H04R 1/083* (2013.01); *H04R 1/20* (2013.01); *H04R 1/326* (2013.01); *H04R 3/005* (2013.01); *H04R 2201/405* (2013.01); *H04R 2499/13* (2013.01)

(58) Field of Classification Search
None
See application file for complete search history.

(56) References Cited

U.S. PATENT DOCUMENTS

| 7,146,013 B1 | 12/2006 | Saito et al. | |
| 2002/0009203 A1* | 1/2002 | Erten | .............................. 381/92 |

(Continued)

FOREIGN PATENT DOCUMENTS

| JP | S62-62553 | 4/1987 |
| JP | 11-219193 | 8/1999 |

(Continued)

OTHER PUBLICATIONS

Notification of Reasons for Refusal, Japanese Application P2011-243535, Mailed: Oct. 8, 2013, English translation included.

*Primary Examiner* — Andrew L Sniezek
(74) *Attorney, Agent, or Firm* — Rankin, Hill & Clark LLP (57) ABSTRACT

A microphone array arrangement structure in a vehicle cabin is provided with multiple microphones arranged in a convex line. The microphones include a first microphone, and the direction of the axis of the first microphone faces the mouth of the driver. The microphone array arrangement structure is provided with covers housing the microphones and having multiple holes. The front surface of the covers form a convexly curved line, and each of the microphones is fixed inside of a cover to correspond to one of the holes.

10 Claims, 7 Drawing Sheets

(56) References Cited

U.S. PATENT DOCUMENTS

| | | |
|---|---|---|
| 2008/0187148 A1 | 8/2008 | Itabashi et al. |
| 2012/0027241 A1* | 2/2012 | Turnbull et al. ............. 381/365 |
| 2012/0330652 A1* | 12/2012 | Turnbull et al. ............. 704/226 |
| 2013/0129107 A1* | 5/2013 | Larson et al. ............... 381/71.7 |

FOREIGN PATENT DOCUMENTS

| | | |
|---|---|---|
| JP | 2000-188795 | 7/2000 |
| JP | 2000-312395 | 11/2000 |
| JP | 2008-193420 | 8/2008 |
| JP | 2009-225379 | 10/2009 |

* cited by examiner

FIG.7

MICROPHONE ARRAY ARRANGEMENT STRUCTURE IN VEHICLE CABIN

TECHNICAL FIELD

The present invention relates to a structure for arranging a plurality of microphones in a row in a vehicle cabin of an automobile or other vehicle.

BACKGROUND ART

There is a general need to further improve the voice recognition rate of a voice recognition unit disposed in a car navigation device or the like in a vehicle cabin under conditions in which engine noise, road noise, and other noises penetrate the vehicle cabin interior.

For example, in the system disclosed in Patent Literature 1, a plurality of microphones is arranged (in a planar or rectilinear shape) in a sun visor, the directionality of a single microphone matches the direction of a talker, and the directionality of another adjacent microphone matches a different direction away from the direction of the talker by a fixed angle. The adaptive signal processor of the system in Patent Literature 1 is generally an adaptive type (subtractive type) that subtracts the noise obtained by the single microphone from the voice obtain by the single microphone to increase the SN ratio and thereby contribute to an improvement in the voice recognition rate.

Also, in the system disclosed in e.g., Patent Literature 2, a plurality of microphones is arranged in an arcuate shape (in a planar or concave curved line shape), and the directionality of the microphones matches the direction of a sound source. The signal addition means of the system in Patent Literature 2 is an addition type which adds the voice (the distance from the sound source to the microphone is fixed) and noise (the distance from the noise source to the microphone is not fixed) obtained from the microphones, accentuates the voice and offsets the noise to increase the SN ratio, and thereby contributes to an improvement in the voice recognition rate.

However, the present inventors, as a result of studying patent literature 1 and 2, recognized that further improvement in the recognition ratio is required in a voice recognition unit in a vehicle cabin.

Additionally, as a result of studying the application of a voice recognition unit in a vehicle cabin to not only a car navigation device, but also to an air conditioner, an interior lighting device, and other devices, the present inventors recognized that an assistant may also be present in addition to the driver as occupants in a vehicle cabin, and that further improvement in the recognition ratio is required in order to allow voice operation by a plurality of occupants. In other words, in the system in Patent Literature 1, the voice of an assistant would be recognized as noise in the other microphones; and in the system in Patent Literature 2, the voice of an assistant would not match a sound source, and the voice of the assistant cannot be effectively accentuated by the plurality of microphones.

PRIOR ART LITERATURE

Patent Literature 1: Japanese Patent Application Laid-open Publication (JP-A) No. 2000-312395

Patent Literature 2: Japanese Patent Application Laid-open Publication (JP-A) No. 2000-188795

SUMMARY OF INVENTION

Technical Problem

An object of the present invention is to provide, inter alia, a structure for arranging a plurality of microphones in a vehicle cabin that can improve sound resolution performance. Other objects of the present invention will become apparent to a person skilled in the art by referring to the plurality of configurations and preferred embodiments described below, and by referencing the accompanying drawings.

Solution to Problem

Preferred forms of the present invention are presented as examples below in order to facilitate understanding of the general overview of the present invention.

According to a first aspect of the present invention, there is provided a microphone array arrangement structure in a vehicle cabin, characterized in that the structure comprises a plurality of microphones, the plurality of microphones being arranged in a convexly curved line, the plurality of microphones having a first microphone, and an axial direction of the first microphone facing the mouth of a driver.

Since the plurality of microphones is arranged in a convexly curved line, the time for sound waves to arrive at other microphones in comparison with the time for sound waves to arrive at, e.g., a first microphone, is therefore greater than in comparison with when, e.g., a linear arrangement is used. Therefore, the resolution of the microphone arrangement structure is improved.

According to a second aspect of the invention, preferably, the microphone array arrangement structure further comprises a cover housing the plurality of microphones and having a plurality of holes, the cover having a front surface formed in the convexly curved line, and each of the plurality of microphones being secured to an inner side of the cover so as to correspond to one of the plurality of holes.

Forming the front surface of the cover in a convexly curved line reduces the likelihood that sound waves arriving at the front surface will be isolated or undergo interference, and as a result, the resolution of the microphone array arrangement structure is improved.

According to a third aspect of the invention, preferably, the plurality of holes has a set of holes that are bilaterally symmetrical about a center line of the vehicle cabin, the plurality of microphones furthermore has a second microphone, the axial direction of the first microphone faces the mouth of the driver via one of the laterally symmetrical set of holes, and an axial direction of the second microphone faces the mouth of an assistant via the other of the laterally symmetrical set of holes.

With this arrangement, the microphone array arrangement structure is capable of uniformly acquiring both the voice from the driver in the direction of the first microphone and the voice from an assistant in the direction of the second microphone. The driver can furthermore concentrate on driving a vehicle.

According to a fourth aspect of the invention, preferably, the microphone array arrangement structure further comprises a plurality of seals between the plurality of microphones and the plurality of holes, one among the plurality of seals corresponding to one among the plurality of holes and preventing entry of sound from other than the one hole into a single microphone among the plurality of microphones.

Noise is prevented from penetrating by the seal and the SN ratio of signals obtained by the microphone can be improved.

According to a fifth aspect of the invention, preferably, the plurality of microphones is used in delay-and-sum beamforming.

Signals obtained by the plurality of microphones are added and, e.g., the driver's voice can be accentuated.

A person skilled in the art can readily understand that the embodiments provided as an example of the present invention can be further modified without departing from the spirit of the present invention.

DESCRIPTION OF EMBODIMENTS

The preferred embodiments of the present invention described below are used for facilitating understanding of the present invention. Therefore, a person skilled in the art should note that the present invention is not unduly limited by the embodiments described below.

Figure 1:
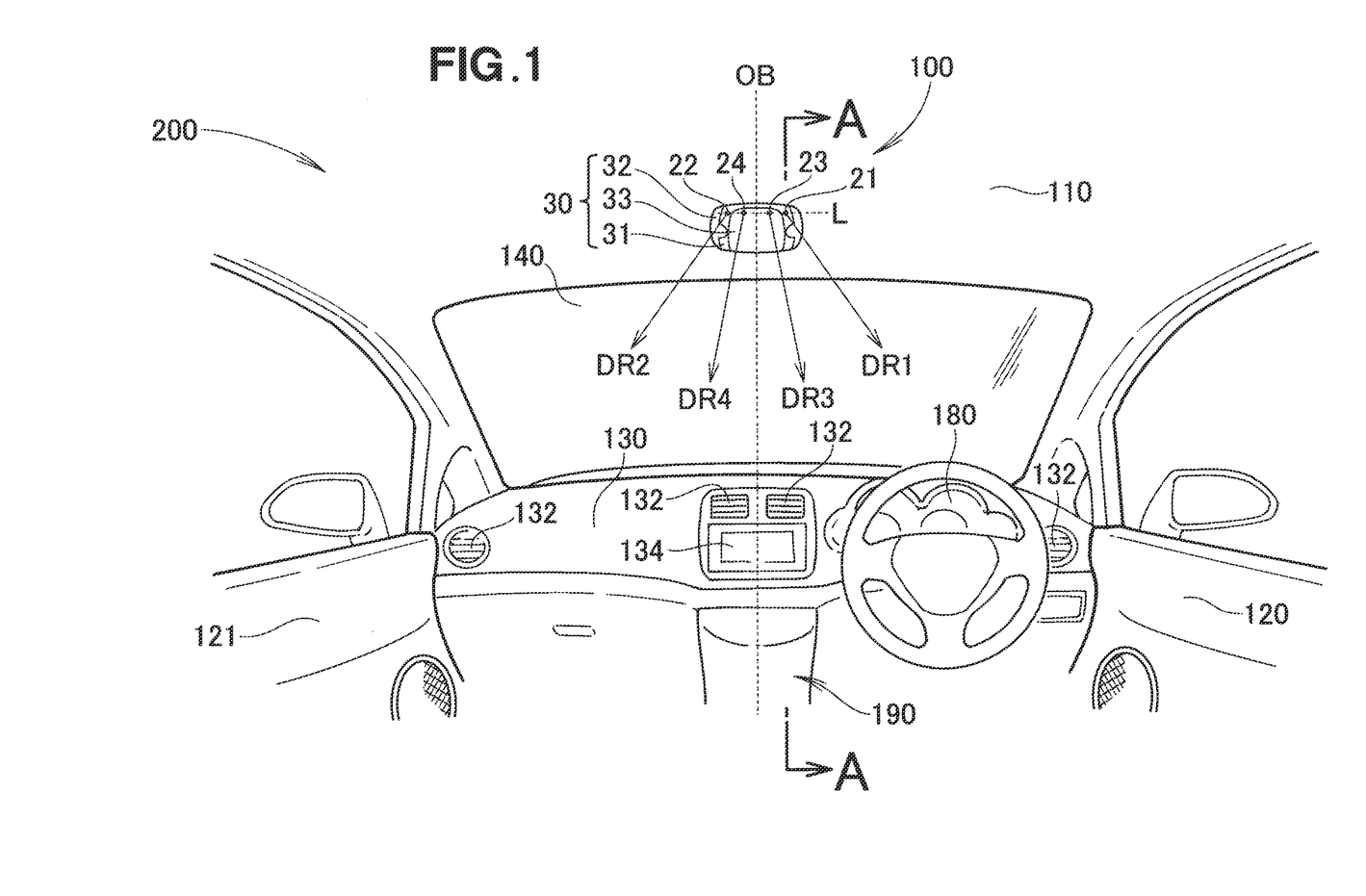
FIG. 1 is a schematic view showing an example of application of the microphone array arrangement structure according to the present invention.

FIG. 1 shows an example of application of the microphone array arrangement structure in a vehicle cabin according to the present invention. An automobile such as a vehicle 200 is provided with a vehicle cabin, and, in the example of FIG. 1, the vehicle cabin is provided with, e.g., a roof lining 110, a right front door lining 120, a left front door lining 121, an instrument panel 130, a front glass 140, and the like. The instrument panel 130 has air vents 132 for the air conditioner in the vehicle cabin, a car navigation device 134, meters 180, and the like.

In the example in FIG. 1, the microphone array arrangement structure 100 in a vehicle cabin according to the present invention is applied to, e.g., an interior illumination device provided to the roof lining 110. In the example in FIG. 1, the microphone array arrangement structure 100 doubles as an interior illumination device, and the microphone array of the microphone array arrangement structure 100 is disposed inside covers 30, 31, 32, 33 of the microphone array arrangement structure 100 or the interior illumination device. For example, the four microphones constituting the microphone array face four directions DR1, DR2, DR3, DR4 via holes 21, 22, 23, 24 in the covers 31, 33. The cover 30 of the microphone array arrangement structure 100 housing the microphone array is composed of, e.g., three members 31, 32, 33, but may also be composed of a single member, or may be composed of 2 or 4 or more members.

The example in FIG. 1 may be modified, and the microphone array arrangement structure 100 may be applied to the lower side 190 in the center part (corresponding to the center line OB in the vehicle cabin) of the instrument panel 130 or another interior member and the microphone array may be disposed inside the surface (cover) of the interior member.

Figure 2:
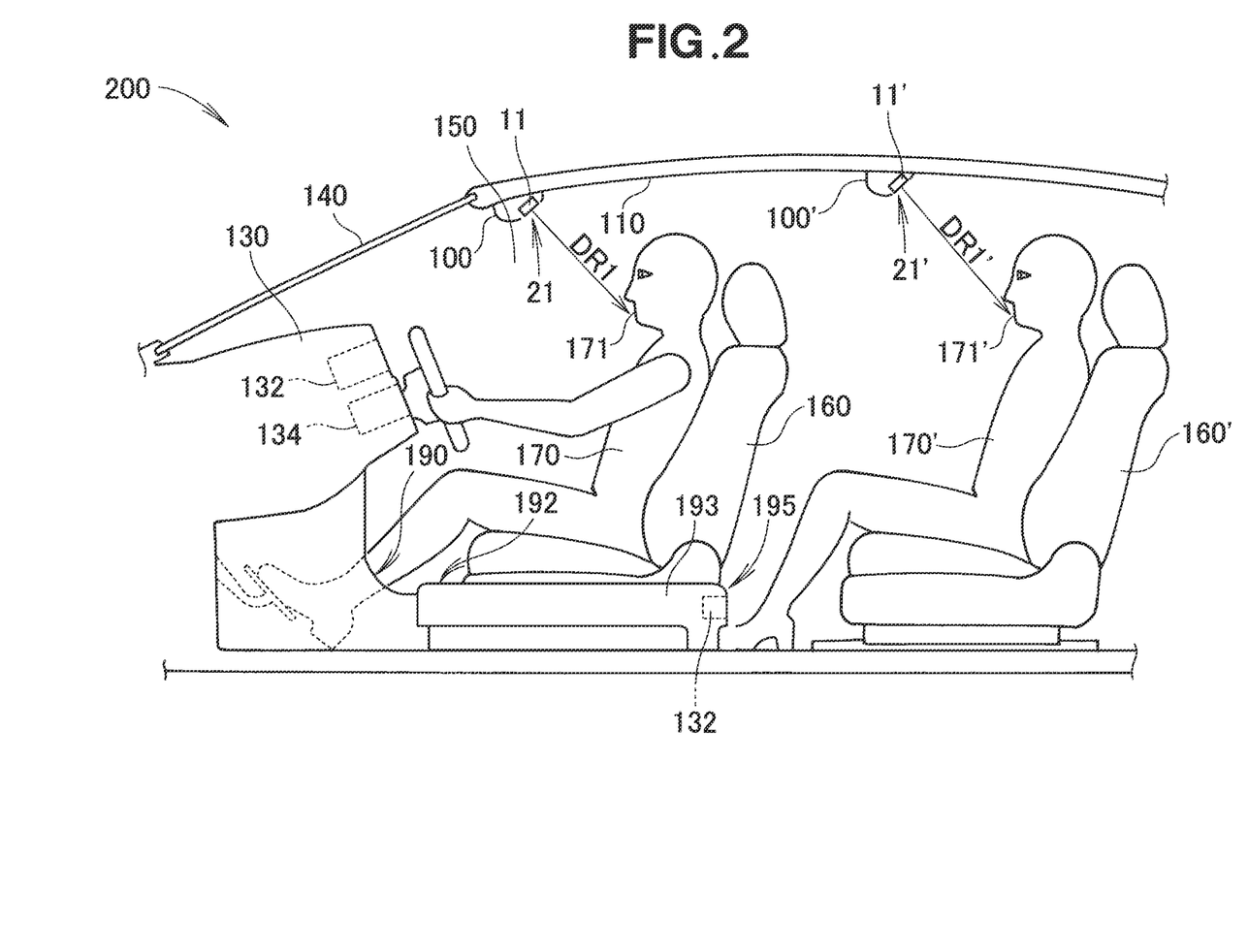
FIG. 2 is a cross-sectional view of a vehicle taken along line A-A of FIG. 1.

FIG. 2 shows a cross-sectional view of a vehicle 200 along the A-A cross section of the microphone array arrangement structure 100 of FIG. 1. In the example in FIG. 2, a microphone array arrangement structure 100 that is the same as or similar to the microphone array arrangement structure 100 is disposed in the vehicle cabin 150 in addition to, e.g., a first row driver-side seat 160, a second row (rear) seat 160', and a center console 193. An occupant 170 (or passenger) sits in the seat 160 as the driver, and one microphone 11 of the microphone array arrangement structure 100 faces the vicinity of the mouth 171 of the occupant 170 via a hole 21. In other words, the axial direction DR1 of the microphone 11 (perpendicular to the vibration plate of the microphone 11) faces the vicinity of the mouth 171 of the occupant 170.

The height of the microphone 11 constituting the microphone array arrangement structure 100 inside the vehicle cabin 150 is essentially equal to the height of the other microphones constituting the microphone array arrangement structure 100 inside the vehicle cabin 150. In other words, the plurality of microphones including the microphone 11 constituting the microphone array arrangement structure 100 can be horizontally positioned.

The microphone array arrangement structure 100' may or may not double as an interior illumination device, and a microphone 11' of the microphone array arrangement structure 100' is disposed inside the cover of the microphone array arrangement structure 100' (or the interior illumination device). The microphone 11' or the axial direction DR1' of the microphone 11' faces the vicinity of the mouth 171 of an occupant 170' (or passenger) that sits in a seat 160' via a hole 21'.

Figure 3:
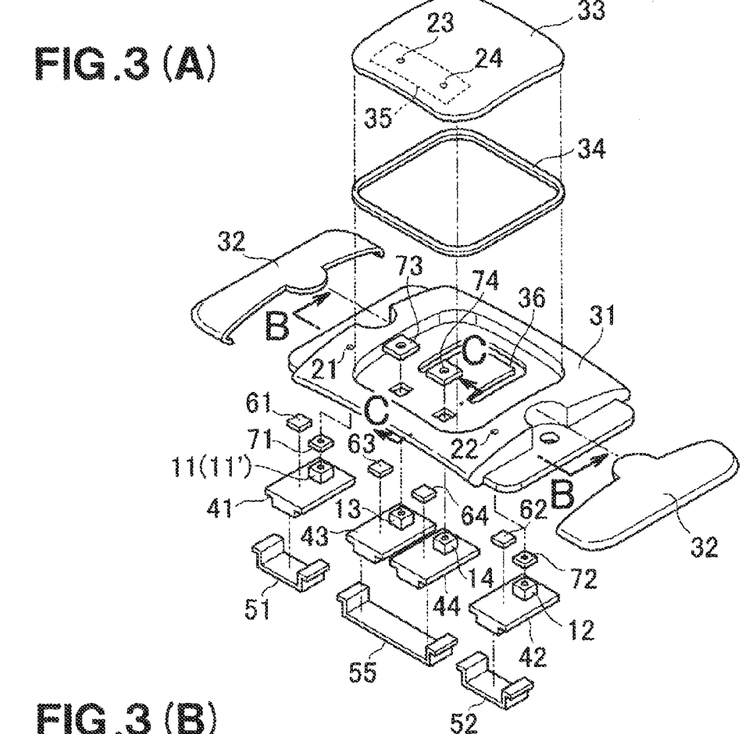
FIG. 3(A) is an exploded perspective view of one example of the microphone array arrangement structure.
FIG. 3(B) is a cross sectional view taken along line B-B of FIG. 3(A)
FIG. 3(C) is a cross sectional view taken along line C-C of FIG. 3(A)
FIG. 3(D) is a view showing an example of the external appearance of a microphone.

FIG. 3(A) shows an example of an exploded perspective view of the microphone array arrangement structure 100. FIG. 3(B) shows a cross section of the microphone array arrangement structure 100 taken along the line B-B of FIG. 3(A). FIG. 3(C) shows a cross section of the microphone array arrangement structure 100 taken along the line C-C of FIG. 3(A). FIG. 3(D) shows an example of the external appearance of the microphone 11. The microphone array of the microphone array arrangement structure 100 is composed of, e.g., four microphones 11, 12, 13, 14, and the four microphones 11, 12, 13, 14 may be assembled so as to correspond to the holes 21, 22, 23, 24, respectively.

For example, a main plane P of the microphone 11 (perpendicular to the axial direction DR1 of the microphone 11) is set so as to face the driver-side seat 160 (see FIG. 3(D) and FIG. 2), and when the microphone 11 is set so as to face the vicinity of the mouth 171 of the occupant 170 (driver), and the microphone 12 is set so as to face the vicinity of the mouth of an occupant (or passenger) acting as an assistant seated in an assistant's seat in the first row. The microphones 13 and 14 are set so as to face the space between the mouth 171 of the occupant 170 (driver) and the mouth of the occupant (assistant).

For example, the microphone 11 (sound collection unit) is mounted on a substrate 41, and the substrate 41 may be secured to the cover 31 via a fastener 51 so as to sandwich a spacer 61 between the substrate 41 and the cover 31, and so as to sandwich a spacer 71 having a hollow part between the microphone 11 and the cover 31 (periphery of the hole 21). The fastener 51 and the cover 31 may be coupled together by a screw (not shown) or an adhesive or other coupling agent, and the main plane P or the axial direction DR1 of the microphone 11 may be adjusted. Similarly, the microphone 12 corresponding to the hole 22 may be secured to the cover 31 via a substrate 42 and a fastener 52. The microphones 13 and 14 corresponding to the holes 23, 24 may also be secured to the cover 31 via a substrate 43, 44 and fastener 55.

Through-holes corresponding to the microphones 13, 14 are provided in a concave part (recessed part) of the cover 31, and a light source 36 is also provided therein. The cover 33 and cover 31 may be coupled together by a coupling agent (not shown) so as to sandwich the spacers 73, 74 and packing 34 between the cover 33 and the cover 31. The cover 33 is composed of a transparent member or a semitransparent member so that light is transmitted from the light source 36, and also functions as, e.g., a diffusion lens. The area 35 of the back surface of the cover 33 (lens) may be coated with a non-transparent material so that the microphones 13, 14 and the spacers 73, 74 cannot be seen by the occupant 170. The cover 31 may be secured to the roof lining 110, and the covers 32, 32 and cover 31 may be coupled together by a coupling agent (not shown).

As shown in FIG. 3(B), the front surface of the covers 31, 32, 33 of the microphone array arrangement structure 100 forms a convexly curved line LC, and the main planes P of the microphones 11, 12, 13, 14 (see FIG. 3(D)) are essentially in contact with a convexly curved line LM, that is to say, the sound collection points of the microphones 11, 12, 13, 14 form the convexly curved line LM. The covers 31, 32, 33 may be composed of, e.g., plastic, metal, or another member that does not absorb sound waves. In view of FIG. 3(C), for example, the microphone 14 can pick up sound from the hole 24 (input hole), while the spacer 74 can prevent entry of sound from other than the hole 24 into the microphone 14. The spacer 74 functions as a seal and may also function as a cushion material in similar fashion to the packing 34.

Figure 4:
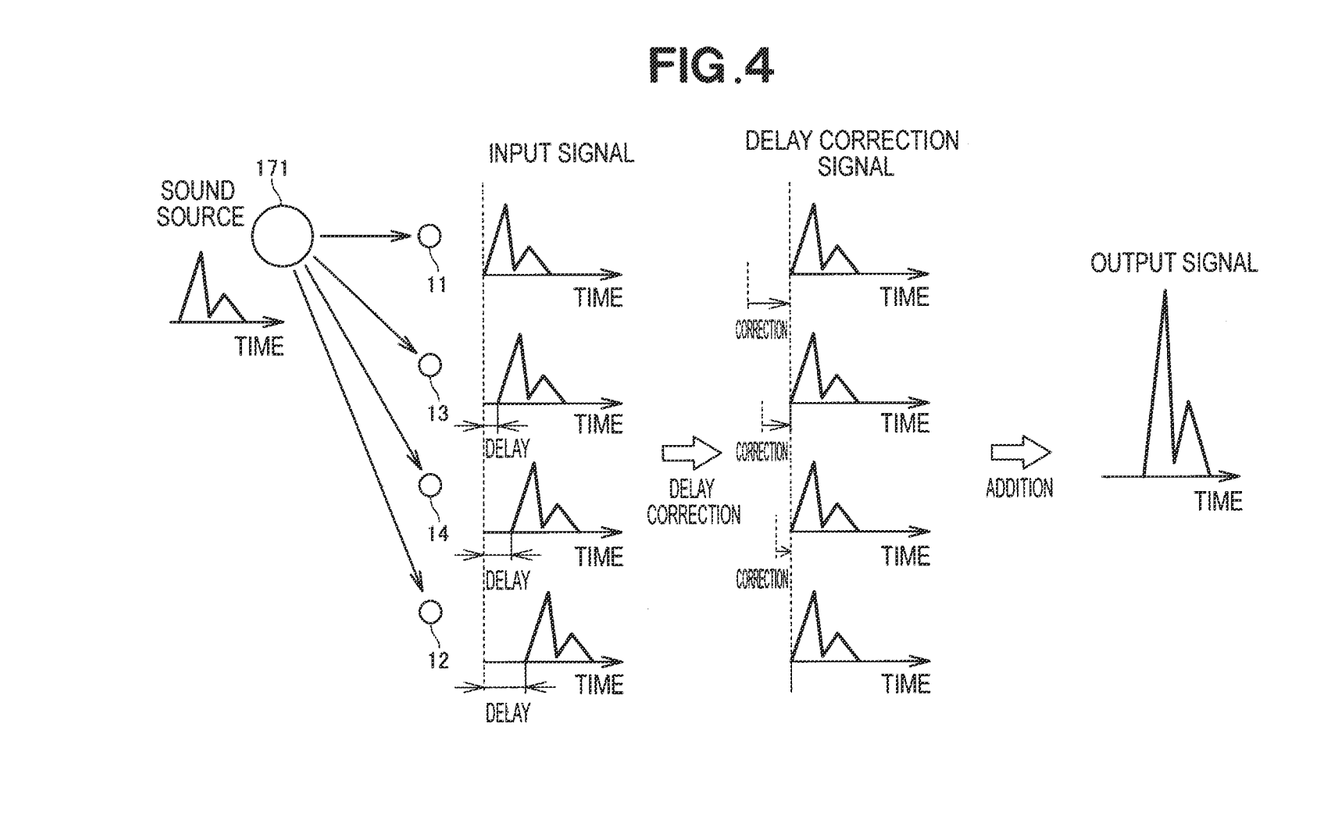
FIG. 4 is a schematic view showing an example of input signal processing showing a sound that arrives at the microphones.

FIG. 4 shows an example of processing an input signal showing a sound that arrives at the microphones 11, 12, 13, 14. In the example of FIG. 4, the waveform that represents the voice of the occupant 170 arrives most quickly at the microphone 11 when, e.g., the mouth 171 of the occupant 170 (driver) is the sound source, and thereafter arrives at the microphones 12, 13, 14 in the sequence of microphones 13, 14, 12. The waveform that represents the voice of the occupant 170 arrives with a delay at microphones 12, 13, 14 in comparison with the microphone 11, and arrives latest at the microphone 12. The input signal in the microphone 11, 13, 14 is corrected for delay using the input signal in the microphone 12 as a reference, and the phases of the input signal in the microphones 11, 12, 13, 14 can be made to match each other. Thereafter adding the delay-corrected input signals (delay-corrected signals) allows an output signal to be obtained. Such processing is additive processing that uses a delay, and is known as delay-and-sum beamforming. Noise is omitted in the example in FIG. 4, but in delay-and-sum beamforming, the phases of noise in the delay-corrected signal mostly do not match each other, and it is possible to obtain an output signal having a higher SN ratio. Subjecting such an output signal to voice recognition processing makes it possible to improve the voice recognition rate, even when there is variability or the like in, e.g., the actual seated height of the driver.

Figure 5:
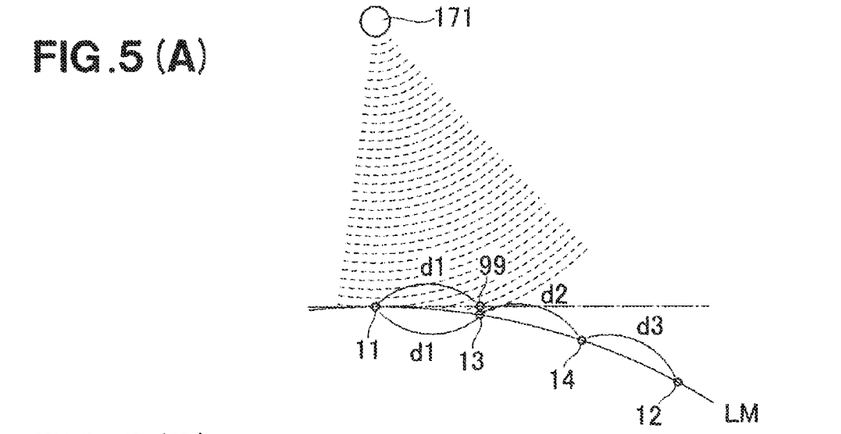
FIG. 5(A) is a view explanatory of a delay time in the microphones.
FIG. 5(B) is a schematic view showing convexly curved lines of FIG. 3(B)
FIG. 5(C) is a schematic view showing a modification of the convexly curved lines.
FIG. 5(D) is a schematic view showing another modification of the convexly curved lines.

FIG. 5(A) shows a view explanatory of the delay time in the microphones 11, 12, 13, 14. FIG. 5(B) shows the convexly curved lines LC, LM of FIG. 3(B). FIG. 5(C) shows a modification of the convexly curved lines LC, LM. FIG. 5(D) shows another modification of the convexly curved lines LC, LM.

As shown in FIG. 5(A), the waveform that represents the voice of the occupant 170 travels in a concentric circular fashion when, e.g., the mouth 171 of the occupant 170 (driver) is the sound source. Let the collection point of a microphone 99 be provisionally arranged on a straight line as in, e.g., Patent Literature 1 at a distance d1 from the collection point of the microphone 11, where d1 the distance between the sound collection point of the microphone 11 and the sound collection point of the microphone 13. The delay time at the sound collection point of the microphone 13 is greater than the delay time (or arrival time) at the sound collection point of the provisional microphone 99. Therefore, the resolution of the delay time of the input signal or the correction time of the delay correction signal is improved, and arranging the microphones 11, 12, 13, 14 on the convexly curved line LM allows an output signal having an greater SN ratio to be obtained in comparison with a linear arrangement such as that in patent document 1.

When the microphones 11, 12, 13, 14 are arranged in a concave curved line as in Patent Literature 2, the resolution of the input signal or delay correction signal is reduced and the SN ratio of the output signal is also reduced.

As shown in FIG. 5(B), the front surface of the covers 31, 32, 33 of the microphone array arrangement structure 100 preferably forms a convexly curved line LC so that the sound waves that have arrived at the front surface are unlikely to be isolated or undergo interference. In other words, a certain amount of isolation or interference is tolerated, and when the front surface of the covers 31, 32, 33 forms two straight lines, as shown in FIG. 5(C), the intersecting angle θ of the two straight lines at the boundary part may be set to be an obtuse angle to form a convexly curved line LC. When the microphones 11, 12, 13, 14 are arranged in a convexly curved line LM, the sound collection points of the microphones 11, 12, 13, 14 can be arranged in a convexly curved line LM'. When the surface of the covers 31, 32, 33 forms two straight lines, a convexly curved line having a large curvature radius R of the two straight lines may be set at the boundary part to form a convexly curved line LC, as shown in FIG. 5(D). When the microphones 11, 12, 13, 14 are arranged in a convexly curved line LM, the sound collection point of the microphones 11, 12, 13, 14 can be arranged in a convexly curved line LM'.

The holes 21, 22, 23, 24 that form a convexly curved line LC when viewed in cross section (e.g., FIG. 3(B)) form a straight line L when viewed in a plan view, as shown in FIG. 1. Forming a set of laterally symmetrical holes 21, 22 (microphones 11, 12) and a set of laterally symmetrical holes 23, 24 (microphones 13, 14) with the center line OB of the vehicle cabin as a reference allows both the voice from the driver in the direction DR1 and the voice from an assistant in the direction DR2 to be uniformly acquired, and allows the resolution of the delay correction signal or the input signal that represents the voice from the two directions DR1, DR2 to be enhanced.

Figure 6:
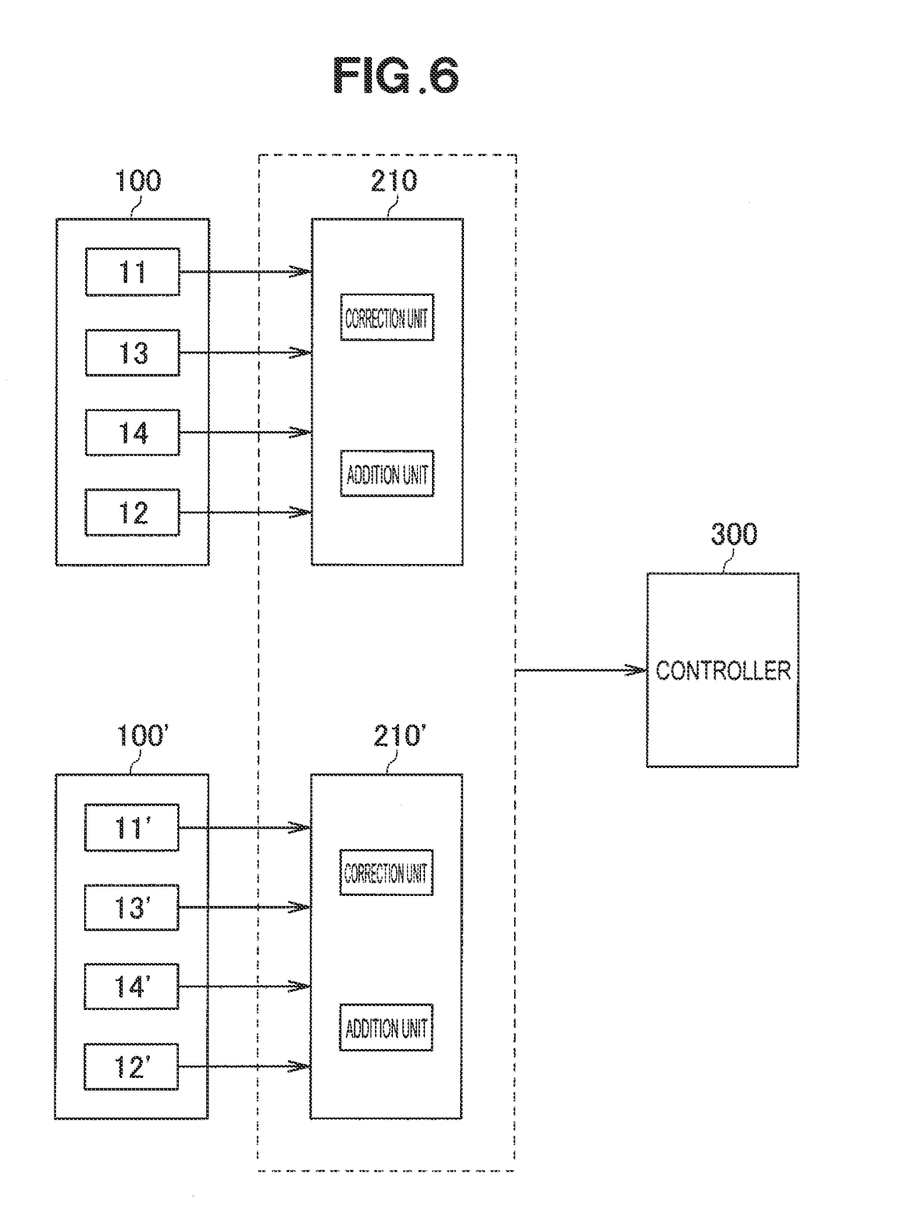
FIG. 6 is a functional block diagram of a vehicle-mounted device in which the microphone array arrangement structure is used as an input unit.

FIG. 6 shows an example of a functional block diagram of a car navigation device 134 in which the microphone array arrangement structures 100, 100' are used as an input unit. In the example in FIG. 6, a controller 300 functions as a processor for the car navigation device 134, and the controller 300 drives a display panel (not shown) in accordance with the determination results of voice recognition units 210, 210', and is capable of controlling the display of the car navigation device 134. The voice recognition unit 210 is provided with a correction unit and an addition unit for carrying out, e.g., delay-and-sum beamforming, and is capable of determining whether a predetermined voice input has occurred. The voice recognition unit 210 mainly recognizes the voice from the occupants 170 (driver and assistant) in the first row of seats 160, and the voice recognition unit 210' mainly recognizes the voice from an occupant 170' in the second row of seats 160'.

In addition to being used as the controller of the car navigation device 134, the controller 300 may also be used in onboard equipment (e.g., air conditioner, interior illumination device, and the like) that does not compromise the driving of the vehicle 200. An assistant other than the driver or an occupant 170' can also operate the onboard device provided with the controller 300 connected to the voice input devices 100, 100', 210, 210'. The driver can thereby concentrate on driving the vehicle 200.

For example, in FIG. 2, the microphone array arrangement structures 100, 100' are positioned in the topmost part of the vehicle cabin 150, but since there is a greater probability that the occupants 170, 170' will speak downward, the microphone array arrangement structures 100, 100' may be positioned in a lower part of the vehicle cabin 150 to facilitate voice pickup. For example, the microphone array arrangement structure 100 may also be positioned on the lower side 190 of the instrument panel 130 in the center area, or in front 192 of the center console 193. The rear microphone array arrangement structure 100' may be positioned, e.g., behind 195 the center console 193.

Figure 7:
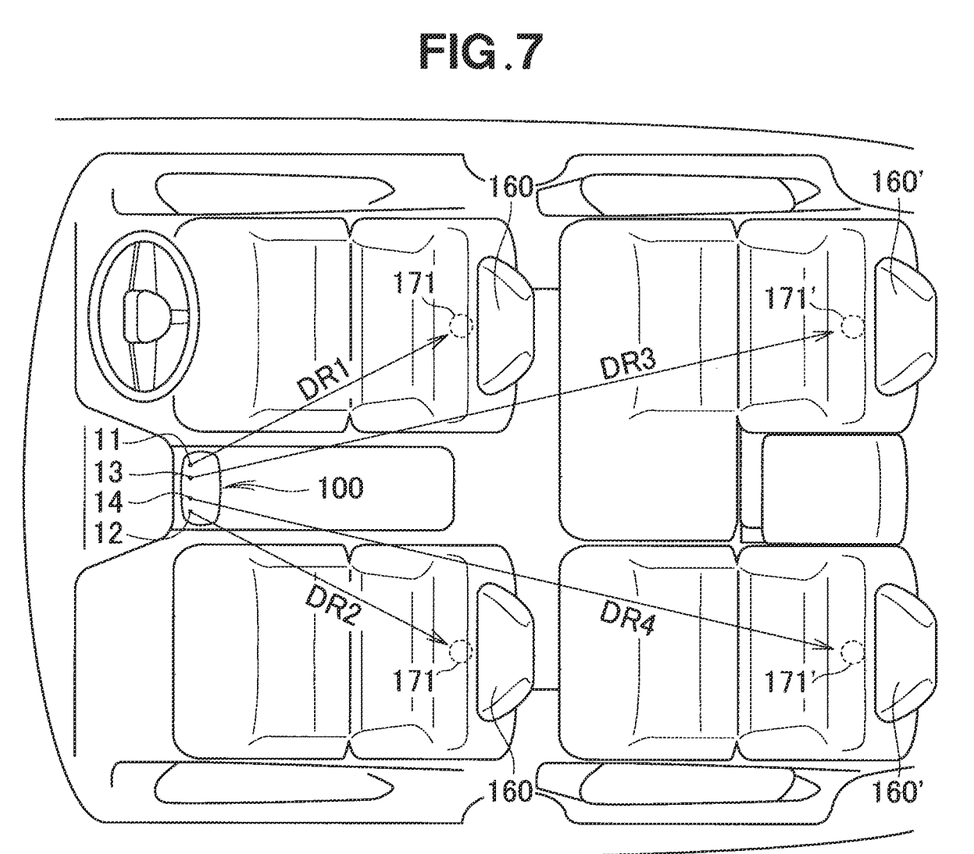
FIG. 7 is a plan view showing another example of application of the microphone array arrangement structure according to the present invention.

FIG. 7 shows another example of application of the microphone array arrangement structure in a vehicle cabin according to the present invention. In the example of FIG. 7, the microphone array arrangement structure 100 is applied to the lower side 190 of the instrument panel 130 in the center area. The microphone 11 or the axial direction DR1 of the microphone 11 faces the vicinity of the mouth 171 of the occupant 170 (driver). The direction DR2 of the microphone 12 faces the vicinity of the mouth 171 of the occupant 170 (assistant). The direction DR3 of the microphone 13 faces the vicinity of the mouth 171' of the occupant 170' in the rear on the right side. The direction DR4 of the microphone 14 faces the vicinity of the mouth 171 of the occupant 170' in the rear on the left side.

The present invention is not limited to the exemplifying embodiments described above which have been used as examples, and a person skilled in the art could easily modify the exemplifying embodiments described above within the scope of the claims.

INDUSTRIAL APPLICABILITY

The present invention is advantageous as a microphone array arrangement structure in a vehicle cabin.

REFERENCE SIGNS LIST 11, 12, 13, 14, 11', 12', 13', 14': microphone;
21, 22, 23, 24: hole;
30, 31, 32, 33: cover;
34: packing;
35: paint area (back surface);
36: light source;
41, 42, 43, 44: substrate;
51, 52, 55: fastener;
61, 62, 63, 64: spacer;
71, 72, 73, 74: spacer (seal);
100: microphone array arrangement structure;
110: roof lining;
120, 121: door lining;
130: instrument panel;
132: air vent;
131: car navigation device;
140: front glass;
150: vehicle cabin; 160, 160':
seat; 170, 170': occupant;
171, 171': mouth;
180: meter;
193: center console;
200: vehicle;
210, 210': voice recognition unit;
300: controller;
OB: center line

The invention claimed is:

1. A microphone array arrangement structure in a vehicle cabin, comprising a plurality of microphones,
wherein the plurality of microphones are all provided within a single housing and arranged in a convexly curved line, the plurality of microphones including:
a first microphone, an axial direction of the first microphone facing a mouth of a driver seated in a driver seat of the vehicle cabin;
a second microphone, an axial direction of the second microphone facing a mouth of an assistant seated in a passenger seat of the vehicle cabin; and
a cover housing the plurality of microphones and having a plurality of holes formed in a front surface of the cover, the front surface of the cover formed in the convexly curved line, and each of the plurality of microphones is mounted on a substrate which is secured directly to an inner side of the front surface of the cover at a location corresponding to one of the plurality of holes,
wherein
the plurality of holes includes a set of holes that are bilaterally symmetrical about a center line of the vehicle cabin, the axial direction of the first microphone faces the mouth of the driver via one of the laterally symmetrical set of holes, and the axial direction of the second microphone faces the mouth of the assistant via another one of the laterally symmetrical set of holes, and
the microphone array further comprising a plurality of seals provided between the plurality of microphones and the plurality of holes, one of the plurality of seals corresponding to one of the plurality of holes and preventing entry of sound from other than the one hole into a single microphone among the plurality of microphones.

2. The microphone array arrangement structure according to claim 1, wherein the plurality of microphones is used in delay-and-sum beamforming.

3. The microphone array arrangement structure according to claim 1, wherein the first microphone is a microphone at a first end of the plurality of microphones along the convexly curved line, and the second microphone is a microphone at a second end of the plurality of microphones along the convexly curved line, the second end being opposite to the first end.

4. The microphone array arrangement structure according to claim 3, wherein the assistant is seated in a front row passenger seat of the vehicle cabin.

5. The microphone array arrangement structure according to claim 3, wherein the first microphone is provided to be a first microphone from among the plurality of microphones to receive a sound input from the mouth of the driver, and the second microphone is provided to be a first microphone from among the plurality of microphones to receive a sound input from the mouth of the assistant.

6. The microphone array arrangement structure according to claim 1, wherein the plurality of microphones consists of:
   the first microphone;
   the second microphone, the axial direction of the second microphone facing the mouth of the assistant seated in a front row passenger seat of the vehicle cabin;
   a third microphone, an axial direction of the third microphone facing a mouth of a driver-side rear-seat assistant seated in a rear row passenger seat on a driver-side of the vehicle cabin; and
   a fourth microphone, an axial direction of the fourth microphone facing a mouth of a passenger-side rear-seat assistant seated in a rear row passenger seat on a passenger-side of the vehicle cabin.

7. The microphone array arrangement structure according to claim 6, wherein the first microphone is a microphone at a first end of the plurality of microphones along the convexly curved line, and the second microphone is a microphone at a second end of the plurality of microphones along the convexly curved line, the second end being opposite to the first end.

8. The microphone array arrangement structure according to claim 7, wherein the first microphone is provided to be a first microphone from among the plurality of microphones to receive a sound input from the mouth of the driver, the second microphone is provided to be a first microphone from among the plurality of microphones to receive a sound input from the mouth of the assistant, the third microphone is provided to be a first microphone from among the plurality of microphones to receive a sound input from the mouth of the driver-side rear-seat assistant, and the fourth microphone is provided to be a first microphone from among the plurality of microphones to receive a sound input from the mouth of the passenger-side rear-seat assistant.

9. The microphone array arrangement structure according to claim 6, wherein the first microphone is provided to be a first microphone from among the plurality of microphones to receive a sound input from the mouth of the driver, the second microphone is provided to be a first microphone from among the plurality of microphones to receive a sound input from the mouth of the assistant, the third microphone is provided to be a first microphone from among the plurality of microphones to receive a sound input from the mouth of the driver-side rear-seat assistant, and the fourth microphone is provided to be a first microphone from among the plurality of microphones to receive a sound input from the mouth of the passenger-side rear-seat assistant.

10. The microphone array arrangement structure according to claim 1, wherein the first microphone is provided to be a first microphone from among the plurality of microphones to receive a sound input from the mouth of the driver, and the second microphone is provided to be a first microphone from among the plurality of microphones to receive a sound input from the mouth of the assistant.

\* \* \* \* \*